US010053530B2

(12) United States Patent
Oishi et al.

(10) Patent No.: US 10,053,530 B2
(45) Date of Patent: Aug. 21, 2018

(54) METHOD FOR PRODUCING A MULTICOMPONENT COPOLYMER

(71) Applicant: BRIDGESTONE CORPORATION, Tokyo (JP)

(72) Inventors: Shigeki Oishi, Hachioji (JP); Shojiro Kaita, Oizumi-machi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/317,526

(22) PCT Filed: Jun. 3, 2015

(86) PCT No.: PCT/JP2015/002817
§ 371 (c)(1),
(2) Date: Dec. 9, 2016

(87) PCT Pub. No.: WO2015/190073
PCT Pub. Date: Dec. 17, 2015

(65) Prior Publication Data
US 2017/0129981 A1 May 11, 2017

(30) Foreign Application Priority Data
Jun. 12, 2014 (JP) ................................. 2014-121721

(51) Int. Cl.
*C08F 236/10* (2006.01)
*C08F 236/04* (2006.01)
*C08F 4/52* (2006.01)

(52) U.S. Cl.
CPC .......... *C08F 236/10* (2013.01); *C08F 236/04* (2013.01); *C08F 4/52* (2013.01)

(58) Field of Classification Search
CPC .......... C08F 4/52; C08F 236/04; C08F 236/10
See application file for complete search history.

(56) References Cited

U.S. PATENT DOCUMENTS

| | | | | |
|---|---|---|---|---|
| 6,310,164 B1 * | 10/2001 | Morizono | ............. | C08F 210/00 524/574 |
| 6,706,830 B2 * | 3/2004 | Windisch | ............. | C08F 236/04 526/129 |
| 8,653,290 B2 * | 2/2014 | Kaita | ............. | C07F 17/00 502/155 |
| 9,074,035 B2 | 7/2015 | Kaita et al. | | |
| 2004/0030071 A1 | 2/2004 | Windisch et al. | | |
| 2009/0264604 A1 | 10/2009 | Kaita et al. | | |
| 2012/0196993 A1 | 8/2012 | Kaita et al. | | |
| 2013/0197157 A1 | 8/2013 | Kaita et al. | | |
| 2014/0018493 A1 * | 1/2014 | Horikawa | ............. | B60C 1/00 524/574 |
| 2017/0137552 A1 * | 5/2017 | Oishi | ............. | C08F 236/10 |

FOREIGN PATENT DOCUMENTS

| | | |
|---|---|---|
| CN | 1427854 A | 7/2003 |
| CN | 103154059 A | 6/2013 |
| EP | 1777240 A1 | 4/2007 |
| EP | 2 017 280 A1 | 1/2009 |
| EP | 2 463 313 A1 | 6/2012 |
| EP | 2 599 802 A1 | 6/2013 |
| JP | 11-35744 A | 2/1999 |
| JP | 2002-3553 A | 1/2002 |
| JP | 2011-84634 A | 4/2011 |
| JP | 2013079338 A | 5/2013 |
| JP | 2014-37500 A | 2/2014 |
| RU | 2 058 322 C1 | 4/1996 |
| RU | 97 107 733 A | 4/1999 |
| RU | 2002128724 A | 2/2004 |
| RU | 2 500 691 C2 | 12/2013 |
| WO | 2007/129670 A1 | 11/2007 |
| WO | 2011/016210 A1 | 2/2011 |
| WO | 2012/014455 A1 | 2/2012 |
| WO | 2015/190072 A1 | 12/2015 |

OTHER PUBLICATIONS

Rodrigues et al., Stereocontrolled styrene-isoprene copolymerization and stryrene-ethylene-isoprene terpolymerization with a single-component allyl ansa-neodymocene catalyst, Polymer, vol. 49 (2008) 2039-2045, BNSDOCID:XP22589796A, total 7 pages.
International Search Report of PCT/JP2015/002817, dated Sep. 8, 2015. [PCT/ISA/210].
Communication dated Jan. 26, 2018 issued by the Federal Agency for Intellectual Property of Russia in counterpart application No. 2016148734/04.
Communication dated Apr. 24, 2018, from the State Intellectual Property Office of People's Republic of China in counterpart Application No. 201580031481.5.

\* cited by examiner

*Primary Examiner* — Caixia Lu
(74) *Attorney, Agent, or Firm* — Sughrue Mion, PLLC (57) ABSTRACT

Provided is a method for producing a multicomponent copolymer comprising copolymerizing a conjugated diene compound, a non-conjugated olefin compound, and an aromatic vinyl compound to produce a multicomponent copolymer having a main chain consisting of an acyclic structure.

11 Claims, 4 Drawing Sheets

METHOD FOR PRODUCING A MULTICOMPONENT COPOLYMER

CROSS REFERENCE TO RELATED APPLICATIONS

This application is a National Stage of International Application No. PCT/JP2015/002817 filed Jun. 3, 2015, claiming priority based on Japanese Patent Application No. 2014-121721, filed Jun. 12, 2014, the contents of all of which are incorporated herein by reference in their entirety.

TECHNICAL FIELD

The present disclosure relates to a method for producing a multicomponent copolymer.

BACKGROUND

Rubber products (such as tires, conveyor belts, vibration-insulating rubbers, and seismic isolation rubbers) are generally required to have high durability (such as fracture resistance, wear resistance, and crack growth resistance) and weather resistance. In order to meet such demand, various rubber components and rubber compositions have been developed. For example, WO2012/014455A (PTL 1) discloses a copolymer of a conjugated diene compound and a non-conjugated olefin in which the cis-1,4 bond content of the conjugated diene portion (units derived from a conjugated diene compound) is greater than 70.5 mol % and the non-conjugated olefin content is 10 mol % or more, and also discloses the use of the component for manufacturing rubber having good crack growth resistance and good weather resistance.

Such copolymer is a bipolymer obtained by polymerizing one kind of a conjugated diene compound and one kind of non-conjugated olefin, and a bipolymer thus obtained tends to be increased in crystallinity due to the increased content of the non-conjugated olefin units contributing to improving weather resistance. Such increase in crystallinity in copolymers involves a fear of damaging the physical properties as an elastomer, and also a fear of impairing workability in using such copolymers to produce rubber compositions and rubber products (in particular, in the process of kneading in producing rubber composition).

CITATION LIST

Patent Literature

PTL 1: WO2012/014455A

SUMMARY

Technical Problem

To solve the aforementioned problems involved in bipolymers, it may be conceivable to provide, as a polymer capable of improving durability and weather resistance of rubber compositions and rubber products while being low in crystallinity and excellent in workability, a multicomponent copolymer having in combination a moiety derived from a conjugated diene compound, a moiety derived from a non-conjugated olefin compound, and a moiety derived from an aromatic vinyl compound, with a main chain consisting of an acyclic structure. However, no method has been hitherto reported for copolymerizing a conjugated diene compound, a non-conjugated olefin compound, and an aromatic vinyl compound to thereby produce such multicomponent copolymers. Thus, a terpolymer as one of such multicomponent polymers, for example, has been produced by a method for synthesizing first a bipolymer of a conjugated diene compound and an aromatic vinyl compound and then subjecting the resulting bipolymer to hydrogenation reaction, so as to cause hydrogen to be randomly added to the unsaturated double bonds of the main chain of the bipolymer.

However, the aforementioned method has been costly and low in productivity. It could therefore be helpful to provide the disclosed method for producing a multicomponent copolymer, the method including copolymerizing a conjugated diene compound, a non-conjugated olefin compound, and an aromatic vinyl compound to thereby obtain a multicomponent copolymer having a main chain consisting of an acyclic structure.

Solution to Problem

The disclosed method for producing a multicomponent copolymer includes co-polymerizing a conjugated diene compound, a non-conjugated olefin compound, and an aromatic vinyl compound to thereby produce a multicomponent copolymer having a main chain consisting of an acyclic structure. The disclosed method for producing a multicomponent copolymer allows for co-polymerizing the conjugated diene compound, the non-conjugated olefin compound, and the aromatic vinyl compound to thereby produce a multicomponent copolymer having a main chain consisting of an acyclic structure.

The disclosed method for producing a multicomponent copolymer may preferably include the step of polymerizing the conjugated diene compound, the non-conjugated olefin compound, and the aromatic vinyl compound in the presence of a polymerization catalyst composition including at least one complex selected from the group consisting of: a metallocene complex represented by the following general formula (I); a metallocene complex represented by the following general formula (II); and a half metallocene cation complex represented by the following general formula (III):

(in the formula (I), M represents a lanthanoid element, scandium, or yttrium; $Cp^R$ each independently represents a substituted indenyl group; $R^a$ to $R^f$ each independently represent a hydrogen atom or an alkyl group having 1 to 3 carbon atoms; L represents a neutral Lewis base; and w represents an integer of 0 to 3);

(in the formula (II). M represents a lanthanoid element, scandium, or yttrium; $Cp^R$ each independently represents a substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3); and (III)

(in the formula (III). M represents a lanthanoid element, scandium, or yttrium; $Cp^{R'}$ each independently represents a substituted cyclopentadienyl group, a substituted indenyl group, or a substituted fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion). With this configuration, a conjugated diene compound, a non-conjugated olefin compound, and an aromatic vinyl compound can be copolymerized, allowing for producing, at low cost with efficiency, a multicomponent copolymer with a main chain consisting of an acyclic structure.

In the disclosed method for producing a multicomponent copolymer, $Cp^{R'}$ in the general formula (III) represents a substituted indenyl group, and the substituted indenyl group in the complex represented by the general formula (I), (II), or (III) may preferably have two or more substituents. This configuration allows for increasing the copolymerization ratio of the aromatic vinyl compound.

In the disclosed method for producing a multicomponent copolymer, the substituted indenyl group may preferably have at least one substituent on the five-membered ring of the substituted indenyl group. This configuration allows for further increasing the copolymerization ratio of the aromatic vinyl compound.

In the disclosed method for producing a multicomponent polymer, the substituted indenyl group may preferably have at least one substituent on a phenyl group. This configuration allows for further increasing the copolymerization ratio of the aromatic vinyl compound.

In the disclosed method for producing a multicomponent polymer, the non-conjugated olefin compound may preferably be an acyclic non-conjugated olefin compound, more preferably be an α-olefin, and further preferably be ethylene. This configuration allows for efficient copolymerization with a conjugated diene compound, while producing a multicomponent copolymer further lowered in crystallinity and further improved in weather resistance.

In the disclosed method for producing a multicomponent polymer, the aromatic vinyl compound may preferably be styrene. This configuration allows for efficient copolymerization with a conjugated diene compound, while producing a multicomponent copolymer further reduced in crystallinity and further improved in weather resistance.

In the disclosed method for producing a multicomponent polymer, the conjugated diene compound may preferably be 1,3-butadiene. This configuration allows for producing a multicomponent copolymer effectively improved in durability.

In the disclosed method for producing a multicomponent copolymer, the resulting multicomponent copolymer may preferably contain 50% or more of the 1,4 bond content in the total units derived from the conjugated diene compound. This configuration allows for providing a multicomponent copolymer capable of effectively improving physical properties such as crack growth resistance and wear resistance of rubber compositions and tires.

The disclosed method for producing a multicomponent copolymer may preferably use hexane as a solvent. This configuration allows for reducing environmental burden.

Advantageous Effect

The present disclosure provides a method for producing a multicomponent copolymer, the method copolymerizing a conjugated diene compound, a non-conjugated olefin compound, and an aromatic vinyl compound, to thereby obtain a multicomponent copolymer having a main chain consisting of an acyclic structure.

BRIEF DESCRIPTION OF THE DRAWINGS

In the accompanying drawings.

DETAILED DESCRIPTION

In below, the disclosed method is described in detail with reference to embodiments thereof.

(Method for Producing a Multicomponent Copolymer)

The disclosed method for manufacturing a multicomponent copolymer includes polymerizing a conjugated diene compound, a non-conjugated olefin compound, and an aromatic vinyl compound, to thereby produce a multicomponent copolymer with a main chain consisting of an acyclic structure. Conventionally, no method has been available for copolymerizing a conjugated diene compound, a non-conjugated olefin compound, and an aromatic vinyl compound, to thereby producing a multicomponent copolymer with a main chain consisting of an acyclic structure. Thus, such multicomponent copolymer, for example, the aforementioned terpolymer has been produced by polymerizing a conjugated diene compound an aromatic vinyl compound to obtain a bipolymer, and then subjecting the resulting bipolymer to hydrogenation reaction. In contrast thereto, the disclosed method allowed for copolymerizing a conjugated diene compound, a non-conjugated olefin compound, and an aromatic vinyl compound were copolymerized, to thereby produce a multicomponent copolymer having a main chain consisting of an acyclic structure. Further, as compared with a conventional method of subjecting a bipolymer to hydrogenation reaction, the disclosed production method is capable of significantly increasing a 1.4 bond content in the total units derived from a conjugated diene compound in the produced multicomponent copolymer.

<Multicomponent Copolymer>

The multicomponent copolymer disclosed herein refers to a copolymer obtained by copolymerizing three or more kinds of monomers. In other words, the multicomponent copolymer, which is obtained by copolymerizing a conjugated diene compound, a non-conjugated olefin compound, and an aromatic vinyl compound and has a main chain consisting of an acyclic structure, refers to a copolymer obtained by copolymerizing one or more kinds of conjugated diene compounds, one or more kinds of non-conjugated olefin compounds, and one or more kinds of aromatic vinyl compounds, the polymer having a main chain consisting of an acyclic structure. The disclosed multicomponent copolymer may preferably a terpolymer, as terpolymers are less likely to generate a side reaction during production, as well as being in high industrial demand and highly versatile.

The multicomponent copolymer disclosed herein is a multicomponent copolymer with a main chain consisting of an acyclic structure. The "main chain" herein refers to a long chain connecting bonding terminals of the respective units in the copolymer. The "main chain" does not include any branched moiety (i.e., pendant group) not bonded to an adjacent unit in the each unit constituting the copolymer. For example, the main chain does not include an aromatic ring in a unit derived from an aromatic vinyl compound forming the multicomponent copolymer. In other words, the main chain of a multicomponent copolymer does not include an aromatic ring in a unit derived from an aromatic vinyl compound constituting the multicomponent copolymer unless the aromatic ring is bonded to an adjacent unit.

The "main chain consisting of an acyclic structure" refers to a main chain that includes none of alicyclic structures, aromatic ring structures and heterocyclic structures. The disclosed multicomponent copolymer has a main ring consisting of an acyclic structure, and thus, according to the disclosed production method, the conjugated diene compound, the non-conjugated olefin compound, and a vinyl group of the aromatic vinyl compound are subjected to addition polymerization without undergoing cyclization, to thereby form a main chain.

In the copolymerization of a conjugated diene compound, a non-conjugated olefin compound, and a vinyl group of an aromatic vinyl compound, a case is generally assumed where any alicyclic structure is formed in a main chain of the multicomponent copolymer depending on the catalyst and reaction conditions which are used therein. However, the disclosed production method is capable of copolymerizing a conjugated diene compound, a non-conjugated olefin compound, and a vinyl group of an aromatic vinyl compound through stereoselective and site-selective addition polymerization, which allows for producing a multicomponent copolymer with a main chain consisting of an acyclic structure.

The disclosed multicomponent copolymer may have a main chain which consists only of a straight chain or may have a side chain. Here, the "side chain" does not include a pendant group (such as, for example, an aromatic ring in a unit derived from an aromatic vinyl compound) in each of the monomer units constituting the main chain. The side chain may or may not be a multicomponent copolymer. The disclosed multicomponent copolymer, in which the main chain may include a side chain, is distinctly different from a "graft copolymer". Here, the "graft copolymer" is obtained by graft-bonding one or more side chains onto a main chain, in which at least one kind of the monomers forming the side chain is different from at least one kind of the one or more kinds of monomers constituting the main chain.

The disclosed multicomponent copolymer produced by the disclosed production method (hereinafter, also referred to as "disclosed multicomponent copolymer", simply) is obtained by copolymerizing a conjugated diene compound, a non-conjugated olefin compound, and an aromatic vinyl compound, which thus achieves both high durability derived from the conjugated diene compound and improved weather resistance resulting from the reduced ratio of double bonds through the intermediation of the non-conjugated olefin compound and the aromatic vinyl compound.

Further, the disclosed multicomponent copolymer is obtained through copolymerization using a conjugated diene compound, and thus has more excellent cross-linking properties as compared with a publicly-known copolymer obtained through copolymerization using a non-conjugated diene compound such as a publicly-known ethylene-propylene-nonconjugated diene copolymer (EPDM). Therefore, the disclosed multicomponent copolymer also has an advantage of further improving mechanical properties of rubber compositions and rubber products produced by using the disclosed multicomponent copolymer.

The disclosed multicomponent copolymer may preferably have, in the total units derived from a conjugated diene compound, a 1,4 bond content of 50% or more, and more preferably 70% or more. The bond content of 50% or more in the total units derived from a conjugated diene compound lowers the glass transition temperature, which thus can effectively improve the physical properties such as crack growth resistance and wear resistance of rubber compositions and tires to be obtained by using the resulting multicomponent copolymer. The 1,4 bond in the total units derived from the conjugated diene compound may preferably a cis-1,4 bond, as the inclusion of the cis-1,4 bond allows for exhibiting rubber elasticity. Meanwhile, the 3,4 vinyl bond content and the 1,2 vinyl bond content in the total units derived from the conjugated diene compound, which are not particularly limited, may both be preferably 50% or less, and more preferably 30% or less.

The disclosed multicomponent copolymer may preferably have a melting point ($T_m$) lower than the melting point ($T_m$) of a bipolymer obtained by polymerizing the conjugated diene compound used in the multicomponent copolymer and an arbitrary one kind of the non-conjugated olefin compound and the aromatic vinyl compound used in the multicomponent copolymer. More specifically, the disclosed multicomponent copolymer may preferably have the melting point (Tm) of 100° C. or lower, more preferably 80° C. or lower, and particularly preferably 50° C. or lower. Alternatively, the melting point ($T_m$) of the disclosed multicomponent copolymer may also preferably be disappeared. In these cases, it can be said that the mere addition of a non-conjugated olefin compound or an aromatic vinyl compound to a conventional bipolymer successfully suppressed crystallinity, which can thus further enjoy the advantage of the disclosed multicomponent copolymer obtained through polymerization using a non-conjugated olefin compound and an aromatic vinyl compound. That is, in these cases, rubber compositions and tires to be obtained by using the aforementioned multicomponent copolymer can be manufactured with high workability, while increasing high the durability and weather resistance of the rubber composition and the tires.

Here, when the aforementioned copolymer has a plurality of melting points, the highest should be referenced in the aforementioned comparison.

The disclosed multicomponent copolymer may preferably contain a unit derived from a conjugated diene compound by 1 to 99 mol %, more preferably by 5 to 95 mol %, and particularly preferably by 10 to 90 mol %. When the unit derived from a conjugated diene compound is contained by 1 mol % or more, the resulting multicomponent copolymer is allowed to uniformly behave as an elastomer, which brings higher durability. On the other hand, the unit content of 99 mol % or less can sufficiently obtain effects resulting from the use of a non-conjugated olefin compound and an aromatic vinyl compound.

Further, the disclosed multicomponent copolymer may preferably contain a unit derived from a non-conjugated olefin compound and a unit derived from an aromatic vinyl compound, in total, by 1 to 99 mol %, more preferably by 5 to 95 mol %, and particularly preferably by 10 to 90 mol %. When a unit derived from a non-conjugated olefin compound and a unit derived from an aromatic vinyl compound are contained in total by 1 mol % or more, the resulting multicomponent copolymer can obtain higher weather resistance. On the other hand, when the units are contained in total by 99 mol % or less, effects resulting from the use of a conjugated diene compound can be sufficiently obtained. Further, in a conventional bipolymer (a polymer of a conjugated diene compound and a non-conjugated olefin, and a polymer of a conjugated diene compound and an aromatic vinyl compound), when either a unit derived from a non-conjugated olefin compound or a unit derived from an aromatic vinyl compound generally is contained by 50 mol % or more, i.e., when a unit derived from a conjugated diene compound is contained by 50 mol % or less, sufficient physical properties as an elastomer will be lost. However, the disclosed multicomponent copolymer is capable of suppressing crystallinity using a non-conjugated olefin compound and an aromatic vinyl compound, and thus, a unit derived from a non-conjugated olefin compound or a unit derived from an aromatic vinyl compound can be contained in total by 90 mol % or more while ensuring elastomeric physical properties.

Further, in the disclosed multicomponent copolymer, a unit derived from either one of a non-conjugated olefin compound and an aromatic vinyl compound may preferably be contained, in the total units, by 1 to 99 mol %, more preferably by 3 to 97 mol %, and particularly preferably by 10 to 90 mol %. As described above, a unit derived from either one of the two kinds of non-conjugated olefin compounds may be contained by at least 1 mol %, to thereby effectively suppress crystallinity.

The disclosed multicomponent copolymer may preferably have a polystyrene converted weight average molecular weight (Mw) of 10,000 to 10,000,000, more preferably of 100,000 to 9,000,000, and particularly preferably of 150,000 to 8,000,000. The aforementioned multicomponent copolymer with the Mw of 10,000 or more can sufficiently ensure mechanical strength as a rubber product material, while maintaining high workability with Mw of 10,000,000 or less.

Further, the disclosed multicomponent copolymer has a molecular weight distribution (Mw/Mn) represented by the ratio of a weight average molecular weight (Mw) to a number average molecular weight (Mn), which is preferably 10.0 or less, more preferably 9.0 or less, and particularly preferably 8.0 or less. The multicomponent copolymer having a molecular weight distribution of 10.0 or less can obtain sufficient homogeneity in physical properties of the multicomponent copolymer.

The disclosed multicomponent copolymer may have a chain structure which is not particularly limited and may be selected as appropriate depending on the intended use. Examples of the chain structure may include: a block copolymer having a structure of $A_x$-$B_y$-$C_z$ (x, y, and z each being an integer of 1 or more) where A represents a unit derived from a conjugated diene compound, B represents a unit derived from a non-conjugated olefin compound, and C represents a unit derived from an aromatic vinyl compound; a random copolymer having a structure where A, B, and C are randomly arranged; a tapered copolymer including, in a mixed manner, the random copolymers and the block copolymers; and an alternating copolymer having a structure of $(A-B-C)_w$ (w being an integer of 1 or more).

<Identification of Multicomponent Copolymer>

In order to confirm whether or not the multicomponent copolymer has been obtained by the disclosed production method, the polymerization product may be subjected to such schemes as gel permeation chromatography (GPC), $^1$H-NMR, $^{13}$C-NMR. Specifically, a gel permeation chromatography-refractive index curve (GPC-RI curve) and a gel permeation chromatography-UV absorption curve (GPC-UV curve) may be used to confirm UV absorption by an aromatic ring such as a benzene ring in the copolymer, to thereby identify the presence of a skeleton derived an aromatic vinyl compound. The presence of a unit derived from each of the monomer components may also be confirmed based on $^1$H-NMR spectrum or $^{13}$C-NMR spectrum.

The physical properties and microstructure of the multicomponent copolymer may be identified with such schemes as differential scanning calorimetry (DSC), $^1$H-NMR, $^{13}$C-NMR, and gel permeation chromatography (GPC). Specifically, the melting point (° C.) may be obtained through DSC. The content of a unit derived from each monomer component and cis-1,4 bond content, trans-1,4 bond content, and 1,2 vinyl content in the total units derived from the conjugated diene compound may be obtained by using $^1$H-NMR and $^{13}$C-NMR. The weight average molecular weight and the molecular weight distribution may be obtained through gel permeation chromatography (GPC), using polystyrene as a reference material. The chain structure may be identified based on the physical properties and microstructures identified by using DSC, $^1$H-NMR, $^{13}$C-NMR, GPC To confirm that a multicomponent copolymer has a main chain consisting of an acyclic structure, $^1$H-NMR spectrum and $^{13}$C-NMR spectrum of the multicomponent copolymer may be observed to confirm that the spectra have no peak derived from an alicyclic structure. For example, copolymerization of 1,3-butadiene as the conjugated diene compound and ethylene as the non-conjugated olefin may cause 1,2-addition to 1,3-butadiene, which may likely to result in formation of a cyclopropane ring (three-membered ring) or a cyclopentane ring (five-membered ring) as an alicyclic structure in the main chain. In this case, the resulting multicomponent copolymer may be measured for $^{13}$C-NMR spectrum, so as to confirm that the main chain consists of an acyclic structure when the spectrum has no peak (in a range of 10 to 24 ppm) derived from three- to five-membered alicyclic structure.

Further, when the resulting multicomponent copolymer has peaks in $^1$H-NMR spectrum or GPC spectrum, the peaks being derived from an aromatic ring structure of an aromatic vinyl compound, it can be confirmed that an aromatic ring structure is preserved as a side chain in the multicomponent copolymer.

<Conjugated Diene Compound>

The conjugated diene compound herein refers to a diene compound in a conjugated system. The conjugated diene compound used as a monomer in the disclosed production method is not particularly limited, and may preferably have 4 to 8 carbon atoms. Specific examples of such conjugated diene compound may include: 1,3-butadiene; isoprene; 1,3-pentadiene; 2,3-dimethylbutadiene, with 1,3-butadiene being preferred, as it can effectively improve durability of rubber compositions and tires using the multicomponent copolymer thus produced.

<Non-Conjugated Olefin Compound>

The olefin compound herein refers to an aliphatic unsaturated hydrocarbon, a compound containing one or more carbon-carbon double bonds, and the non-conjugated olefin compound should not include an aromatic vinyl compound. The non-conjugated olefin compound used as a monomer in the disclosed production method is not particularly limited, and may preferably include 2 to 10 carbon atoms. Examples of such non-conjugated olefin compound may include: an α-olefin such as ethylene, propylene, 1-butene, 1-pentene, 1-hexene, 1-heptene, or 1-octene; and a heteroatom-substituted alkene compound such as vinyl pivalate, 1-phenylthioethene, or N-vinylpyrrolidone. Here, the non-conjugated olefin compound may use the above-listed non-conjugated olefin compounds without being specifically limited, with an acyclic non-conjugated olefin compound being preferred, α-olefin being more preferred, and ethylene being particularly preferred. An acyclic non-conjugated olefin compound such as α-olefin, in particular, ethylene, has a double bond at the α position of the olefin, which allows for efficient polymerization with a conjugated diene compound, while further suppressing crystallinity in the produced multicomponent copolymer, to thereby further improve weather resistance of rubber compositions and tires using the multicomponent copolymer.

<Aromatic Vinyl Compound>

The aromatic vinyl compound herein refers to an aromatic compound substituted at least by a vinyl group. The aromatic vinyl compound used as a monomer in the disclosed production method is not particularly limited, and may preferably have 8 to 10 carbon atoms. Examples of such aromatic vinyl compound may include: styrene; o-methylstyrene; m-methylstyrene; p-methylstyrene, o,p-dimethylstyrene; o-ethylstyrene; m-ethylstyrene; and p-ethylstyrene. The aromatic vinyl compound is not particularly limited, and may use the above-listed aromatic vinyl compounds, with styrene being preferred. Styrene can be efficiently polymerized with a conjugated diene compound, while further suppressing crystallinity of the produced copolymer and further improving weather resistance.

<Polymerization Catalyst Composition>

The disclosed method for producing a multicomponent copolymer may preferably include the step of copolymerizing a conjugated diene compound, a non-conjugated olefin compound, and an aromatic vinyl compound in the presence of a polymerization catalyst composition including at least one complex selected from the group consisting of: a metallocene complex represented by the following general formula (I); a metallocene complex represented by the following general formula (II); and a half metallocene cation complex represented by the following general formula (III):

(I)

(in the formula (I), M represents a lanthanoid element, scandium, or yttrium; $Cp^R$ each independently represents a substituted indenyl; $R^a$ to $R^f$ each independently represent a hydrogen atom or an alkyl group having 1 to 3 carbon atoms; L represents a neutral Lewis base; and w represents an integer of 0 to 3);

(II)

(in the formula (II), M represents a lanthanoid element, scandium, or yttrium; $Cp^R$ each independently represents a substituted indenyl; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3); and (III)

(in the formula (III), M represents a lanthanoid element, scandium, or yttrium; $Cp^{R'}$ each independently represents a substituted cyclopentadienyl, a substituted indenyl, or a substituted fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and $[B]^-$ represents a non-coordinating anion).

The polymerization catalyst composition may further include another component such as a co-catalyst, which is contained in a general polymerization catalyst composition containing a metallocene complex. Here, the metallocene complex is a complex compound having one or more cyclopentadienyl groups or derivative cyclopentadienyl groups bonded to the central metal. In particular, a metallocene complex may be also referred to as half metallocene complex when the central metal has one cyclopentadienyl group or one derivative thereof bonded thereto.

In the polymerization system, the concentration of the complex contained in the polymerization catalyst composition is preferably defined to fall within a range of 0.1 mol/L to 0.0001 mol/L.

In the metallocene complex represented by the general formulae (I) and (II) above, $Cp^R$ in the formulae represents a substituted indenyl group. $Cp^R$ having a substituted indenyl ring as a basic skeleton may be represented by $C_9H_{7-X}R_X$ or $C_9H_{11-X}R_X$. Here, X represents the number of substituents on the substituted indenyl group, and is an integer of 1 to 7 or 1 to 11. In terms of increasing the copolymerization ratio of the aromatic vinyl compound, X may preferably be 2 or more, and the substituent may preferably present on the five-membered ring of a substituted indenyl group. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group, with at least one R preferably representing an aromatic group such as a phenyl group and a benzyl group in terms of increasing the copolymerization ratio of the aromatic vinyl compound. X being 2 or more or R having any bulky substituent such as an aromatic group is preferred because it leads to a further bulky $Cp^R$, causing a to-be-polymerized monomer to approach the metal M as a catalyst center of the metallocene complex represented by the general formulae (I) and (II), from the $NSi(R^aR^bR^c)Si(R^dR^eR^f)$ side or the $SiX'_3$ side due to steric hindrance. This facilitates introduction of the non-conjugated olefin compound and the vinyl moiety of the aromatic vinyl compound. Meanwhile, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl, 2-methyl indenyl, 1-methyl-2-phenyl indenyl, 1,3-bis(t-butyldimethylsilyl)indenyl, and 1-ethyl-2-phenylindenyl, and 1-benzyl-2-phenylindenyl. Two $Cp^R$ in the formulae (I) and (II) may be the same as or different from each other.

In the half metallocene cation complex represented by the general formula (III), $Cp^{R'}$ in the formula represents a substituted cyclopentadienyl, substituted indenyl, or substituted fluorenyl, with the substituted indenyl being preferred in terms of increasing the copolymerization ratio of the aromatic vinyl compound. $Cp^{R'}$ having a cyclopentadienyl ring as a basic skeleton is represented by $C_5H_{5-X}R_X$. Here, X represents an integer of 0 to 4. In terms of increasing the copolymerization ratio of the aromatic vinyl compound, X is preferably 2 or more, and may preferably present on the five-membered ring of a substituted indenyl group. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-t-butyl group, a phenyl group, and a benzyl group, with at least one R preferably representing an aromatic group such as a phenyl group and a benzyl group, in terms of increasing the copolymerization ratio of the aromatic vinyl compound. X being 2 or more or R having a bulky substituent such as an aromatic group is preferred because it leads to a further bulky $Cp^R$, causing a to-be-polymerized monomer to approach metal M as a catalyst center of the metallocene complex represented by the general formulae (I) and (II), from the $NSi(R^aR^bR^c)Si(R^dR^eR^f)$ side or the $SiX'_3$ side due to steric effects, which facilitates introduction of the non-conjugated olefin compound and the vinyl moiety of the aromatic vinyl compound. Meanwhile, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is exemplified by the one represented by the following formula:

(in the formula, R' represents a methyl group or an ethyl group, and R represents a hydrogen atom, a methyl group, or an ethyl group).

In the general formula (III), $Cp^{R'}$ having the substituted indenyl ring above as a basic skeleton is similarly defined as $Cp^R$ of the general formula (I), and preferred examples thereof are the same as those of the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 1 to 9 or 1 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group, with at least one R preferably representing an aromatic group such as a phenyl group and a benzyl group in terms of increasing the copolymerization ratio of the aromatic vinyl compound. X being 2 or more or R having a bulky substituent such as an aromatic group is preferred because it leads to a further bulky $Cp^R$, causing a to-be-polymerized monomer to approach metal M as a catalyst center of the metallocene complex represented by the general formulae (I) and (II), from the $NSi(R^aR^bR^c)Si(R^dR^eR^f)$ side or the $SiX'_3$ side due to steric effects, which facilitates introduction of the non-conjugated olefin compound and the vinyl moiety of the aromatic vinyl compound. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y). The metallocene complex represented by the general formula (I) includes a silyl amide ligand represented by [—$N(SiR_3)_2$]. Groups represented by R ($R^a$ to $R^f$ in the general formula (I)) in the silyl amide ligand each independently represent a hydrogen atom or an alkyl group having 1 to 3 carbon atoms, and at least one of $R^a$ to $R^f$ may preferably represent a hydrogen atom. With at least one of $R^a$ to $R^f$ representing a hydrogen atom, the catalyst can be synthesized with ease, and the height around silicon can be reduced, facilitating introduction of the non-conjugated olefin or the aromatic vinyl compound. Based on the same objective, it is more preferred that at least one of $R^a$ to $R^c$ represents a hydrogen atom, and at least one of $R^d$ to $R^f$ represents a hydrogen atom. A methyl group is preferred as the alkyl group.

The metallocene complex represented by the general formula (II) includes a silyl ligand represented by [—$SiX'_3$]. X' in the silyl ligand represented by [—$SiX'_3$] is a group defined as the same as X in the general formula (III) described below, and preferred examples thereof are also the same as those of X in the general formula (III).

In the general formula (III), X represents a group selected from the group consisting of a hydrogen atom, a halogen atom, an alkoxide group, a thiolate group, an amide group, a silyl group, and a hydrocarbon group having 1 to 20 carbon atoms. The alkoxide group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bis trialkylsilyl amide groups such as a bis trimethylsilyl amide group, with the bis trimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl (bistrimethylsilyl)silyl group, with the tris(trimethylsilyl) silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms represented by X may include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bis trimethylsilylmethyl group each containing a silicon atom, with the methyl group, the ethyl group, the isobutyl group, the trimethylsilylmethyl group, and the like being preferred.

In the general formula (III), X preferably represents the bis trimethylsilyl amide group and the hydrocarbon group having 1 to 20 carbon atoms.

In the general formula (III), examples of the non-coordinating anion represented by [B]⁻ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra (tolyl)borate, tetra(xylyl)borate, (tripheyl, pentafluorophenyl)borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the above complexes include a plurality of neutral Lewis bases L, the respective L may be the same as or different from each other.

The metallocene complexes represented by the general formulae (I) to (II), and the half metallocene cation complex represented by the general formula (III) may be each present as a monomer or as a dimer or a multimer having two or more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature may be set no higher than room temperature, and thus the complex can be produced in mild conditions. In addition, reaction time is arbitrary, and may be about several hours to several tens of hours. The reaction solvent, which is not particularly limited, may preferably the one that dissolves a raw material and a product, and may use toluene for example. In the following, a reaction example for obtaining the complex represented by the general formula (I) is described (In the formula, X" represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature may be set no higher than room temperature, and thus the complex can be produced in mild conditions. In addition, reaction time is arbitrary, and may be set to about several hours to several tens of hours. The reaction solvent, which is not particularly limited, may preferably the one that dissolves a raw material and a product, and may use toluene for example. In the following, a reaction example for obtaining the complex represented by the general formula (II) is described.

(In the formula, X" represents a halide.)

The half metallocene cation complex represented by the general formula (III) can be obtained by, for example, the following reaction:

Here, in a compound represented by the general formula (IV), M represents a lanthanoid element, scandium, or yttrium; CpR' independently represents a substituted cyclopentadienyl, a substituted indenyl, or a substituted fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, with the N,N-dialkylanilinium cations being particularly preferred.

In the general formula $[A]^+[B]^-$ representing the ionic compound to be used in the above reaction is a compound obtained by combining the non-coordinating anions described above and any one selected from the cations described above, with N,N-dimethylanilinium tetrakis(pentafluorophenyl)borate and triphenyl-carbonium tetrakis(pentafluorophenyl)borate being preferred. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complex represented by the general formula (I) or (II) and of the half metallocene cation complex represented by the general formula (III) is preferably determined by X-ray crystallography.

The co-catalyst that can be contained in the polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more kinds thereof.

The aluminoxane is preferably an alkyl aluminoxane, which may be exemplified by methylaluminoxane (MAO) and modified methylaluminoxanes. In addition, preferred examples of the modified methyl aluminoxane include MMAO-3A (manufactured by Tosoh Finechem Corporation). The aluminoxane may be contained in the polymerization catalyst composition in an amount of preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group having 1 to 10 carbon atoms or a hydrogen atom, and R" is a hydrocarbon group having 1 to 10 carbon atoms). Examples of the organic aluminum compound include: trialkyl aluminum; a dialkyl aluminum chloride; an alkyl aluminum dichloride; and a dialkyl aluminum hydride, with the trialkyl aluminum being preferred. Further, examples of the trialkyl aluminum include triethyl aluminum and triisobutyl aluminum. The organic aluminum compound may be contained in the polymerization catalyst composition in an amount of preferably 1-fold mol to 50-fold mol and more preferably about 10-fold mol, with respect to the metallocene complex.

Further, in the polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a polymer to be obtained.

<Polymerization Step>

The disclosed production method includes the step of polymerizing, in the presence of the polymerization catalyst composition, the conjugated diene compound, the non-conjugated olefin compound, the an aromatic vinyl compound (hereinafter, the step is also referred to as polymerization step), and may further include, as necessary, the step of coupling (coupling step), the step of cleaning (cleaning step), and other steps.

An arbitrary method may be used as the polymerization step, which may include: a solution polymerization; a suspension polymerization; a liquid phase bulk polymerization; an emulsion polymerization; a gas phase polymerization; and a solid phase polymerization. When a solvent is used for the polymerization reaction, any solvent may be used as long as inactive in the polymerization reaction, and examples of such solvent may include toluene and hexane (for example, cyclohexane, normal hexane), with hexane being preferred. The use of hexane as a solvent for polymerization can reduce environmental burden.

In the disclosed production method, the polymerization step may be performed at one stage or multiple stages of two or more stages. The polymerization step at one stage refers to the step of simultaneously reacting to polymerize all three kinds of monomers to be polymerized, that is, a conjugated diene compound, a non-conjugated olefin compound, and an aromatic vinyl compound. The polymerization step at multiple stages refers to the step of first reacting some or all of one or two kinds of monomers to form a polymer (first polymerization stage), and then performing one or more stages of adding the remaining kinds of monomers and the reminder of the one or two kinds of monomers to polymerize the monomers (second polymerization stage to final polymerization stage).

In the presence of the polymerization catalyst composition, the order of charging the monomers, the input amount of the monomers, and other reaction conditions may be controlled, to thereby control the bond contents (cis-1,4 bond content, trans-1,4 bond content, 3,4 vinyl bond content, and 1.2 vinyl bond content) in the total units derived from a conjugated diene compound and the total content of each unit derived from each monomer (that is, copolymerization ratio of each monomer) in the produced multicomponent copolymer.

In the disclosed production method, the polymerization step may preferably be performed in an inert gas atmosphere, and preferably in nitrogen or argon atmosphere. The polymerization temperature of the polymerization step is not particularly limited, and preferably in a range of, for example, −100° C. to 200° C., and may also be set no higher than room temperature. An increase in polymerization temperature may reduce the cis-1,4-selectivity in the polymerization reaction. The polymerization step is preferably performed under pressure in a range of 0.1 MPa to 10.0 MPa so as to allow a non-conjugated olefin to be sufficiently introduced into the polymerization system. Further, the reaction time of the polymerization step is not particularly limited, and may preferably be in a range of, for example, 1 second to 10 days, which may be selected as appropriate depending on the conditions such as: the micro structure desired for the resulting multicomponent copolymer; the amount of input, addition order, and type of the monomers; the type of the catalyst; and the polymerization temperature. In the polymerization step, a polymerization inhibitor such as methanol, ethanol, and isopropanol may be used to stop the polymerization.

<Coupling Step>

The coupling step is for performing reaction (coupling reaction) to modify at least part (for example, a terminal end) of a polymer chain of the multicomponent copolymer obtained in the polymerization step. In the coupling step, the coupling reaction may preferably be performed when the polymerization reaction has reached 100%.

The coupling agent used in the coupling reaction is not particularly limited and may be selected as appropriate depending on the intended use. Examples thereof may include: a tin-containing compound such as bis(maleic acid-1-octadecyl)dioctyltin; an isocyanate compound such as 4,4'-diphenylmethane diisocyanate; and an alkoxysilane compound such as glycidylpropyltrimethoxysilane, which may be used alone or in combination of two or more kinds thereof, with bis(maleic acid-1-octadecyl)dioctyltin being preferred in terms of the reaction efficiency and low gel formation.

The coupling reaction thus performed may increase the number-average molecular weight (Mn).

<Cleaning Step>

The cleaning step is for cleaning the multicomponent copolymer obtained in the polymerization step. Here, the medium to be used in the cleaning is not particularly limited, and may be selected as appropriate depending on the intended use. Examples thereof may include methanol, ethanol, and isopropanol. These solvents may be added with an acid (such as hydrochloric acid, sulfuric acid, nitric acid) when using Lewis acid catalyst as the polymerization catalyst. The amount of acid to be added may preferably be 15 mol % or less to the solvent. The acid will remain in the copolymer when added in an amount exceeding 15 mol %, which may affect the reaction at kneading and vulcanization.

The cleaning step can suitably reduce catalyst residue in the copolymer.

(Rubber Composition)

The disclosed multicomponent copolymer may be used to produce a rubber composition. The rubber composition at least includes, as the rubber component, the disclosed multicomponent copolymer, and may include, as necessary, other rubber components, a filler, a crosslinking agent, and other components.

Here, other rubber components may be selected as appropriate depending on the intended use, and examples thereof may include, without being particularly limited thereto, polyisoprene, butadiene rubber (BR), acrylonitrile-butadiene rubber (NBR), chloroprene rubber, ethylene-propylene rubber (EPM), ethylene-propylene-nonconjugated diene rubber (EPDM), polysulfide rubber, silicone rubber, fluororubber, and urethane rubber, which may be used alone or in combination of two or more kinds thereof.

Further, the rubber composition may use a filler as needed for the purpose of improving reinforcement or the like. The amount of the filler to be compounded is not particularly limited, and may be selected depending on the intended use, which may be in an amount of preferably 10 to 100 parts by mass, more preferably 20 to 80 parts by mass, particularly preferably 30 to 60 parts by mass per 100 parts by mass of the rubber component. The filler compounded in an amount of 10 parts by mass or more provides an effect of improving reinforcement through the compounding of the filler, and the filler compounded in an amount of 100 parts by mass or less can maintain favorable workability while avoiding significant reduction in low loss property.

Examples of the filler may include, without being particularly limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate, with the use of carbon black being preferred. These may be compounded alone or in combination of two or more kinds thereof.

Examples of the carbon black may be selected as appropriate depending on the intended use without being particularly limited, and may include, for example, FEF, GPF, SRF, HAF, N339, IISAF, ISAF, SAF, which may be used alone or in combination of two or more kinds thereof.

The nitrogen absorption specific surface area ($N_2SA$, measured according to JIS K 6217-2:2001) is not particularly limited and may be selected as appropriate depending on the intended use, which may preferably be 20 to 100 $m^2/g$, and more preferably 35 to 80 $m^2/g$. The carbon black having the nitrogen absorption specific surface area ($N_2SA$) of 20 $m^2/g$ or more improves durability of the resulting rubber composition providing sufficient crack growth resistance, and the carbon black having the nitrogen absorption specific surface area ($N_2SA$) of 100 $m^2/g$ or less can maintain favorable workability while avoiding significant reduction in low loss property.

The rubber composition may use a crosslinking agent as necessary. The crosslinking agent may be selected as appropriate depending on the intended use, and the examples thereof may include, without being particularly limited, for example, a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-based crosslinking agent (vulcanizing agent) being more preferred as the rubber composition for use in tires.

The crosslinking agent above may be contained preferably in a range of 0.1 to 20 parts by mass per 100 parts by mass of the rubber component, which may be selected as appropriate depending on the intended use without being particularly limited. Crosslinking may hardly be progressed with the content of the crosslinking agent falling below 0.1 parts by mass, whereas the content exceeding 20 parts by mass tends to allow some of the crosslinking agent to inadvertently promote crosslinking during the kneading, which may also impair the physical property of the vulcanized product.

When using the vulcanizing agent, vulcanization accelerators may additionally be used in combination. Examples of the vulcanization accelerators may include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound. Further, the disclosed rubber composition may use, as necessary depending on the intended use, a softener, a vulcanization aid, a colorant, a flame retarder, a lubricant, a foaming agent, a plasticizer, a processing aid, an antioxidant, an age resistor, an antiscorching agent, an anti-ultraviolet agent, an antistatic agent, and other publicly-known compounding agents.

(Crosslinking Rubber Composition)

The rubber composition above including the disclosed multicomponent copolymer may be crosslinked to obtain a crosslinked rubber composition. The crosslinking conditions are not particularly limited and may be selected as appropriate depending on the purpose, and the crosslinking may be performed preferably at a temperature of 120° C. to 200° C. over a warming time of 1 minute to 900 minutes. The crosslinked rubber composition thus obtained, which uses a conjugated diene compound as a monomer of the rubber component, is excellent in crosslinking property and thus has a higher mechanical property, as compared with a case of EPDM which uses a polymer having a non-conjugated diene compound as a monomer thereof.

(Tire)

Tires may be manufactured using the rubber composition including the disclosed multicomponent copolymer. The tire is not particularly limited as long as it uses a rubber composition including the disclosed multicomponent copolymer, and may be selected as appropriate depending on the intended use. The tire uses a rubber composition containing the disclosed multicomponent copolymer, and thus can be manufactured with high workability, as being high in durability and weather resistance. The disclosed rubber composition may be applied to any part of the tire with no particular limitation, which may be selected as appropriate depending on the intended use. Examples thereof may include a tread, a base tread, a sidewall, a side reinforcing rubber, and a bead filler. Of those, the disclosed rubber composition may advantageously be used for a tread in terms of durability.

The aforementioned tire may be manufactured by a conventional method. The method may include, for example, sequentially applying and stacking, onto a tire molding drum, members generally used in manufacturing tires, such as a carcass layer, a belt layer, and a tread layer formed of an unvulcanized rubber composition and/or cords, removing the drum therefrom to provide a green tire, and then vulcanizing the green tire by heating using an ordinary method, to thereby manufacture a desired tire (for example, a pneumatic tire).

(Other Applications than in Tires)

The rubber composition including the disclosed multicomponent copolymer is applicable to vibration-insulating rubbers, seismic isolation rubbers, belts for conveyor belts, rubber crawlers, and various hoses, other than to tires.

EXAMPLES

In the following, the present disclosure is described in detail with reference to Examples. However, the present disclosure is no way limited to Examples in below.

Synthesis Example 1: Terpolymer A

A toluene solution of 250 g containing 50 g (0.48 mol) of styrene was added to a 2 L stainless steel reactor that had been sufficiently dried. Meanwhile, in a glovebox under a nitrogen atmosphere, 38.5 μmol of bis(1-methyl-2-phenyl-indenyl)gadolinium bis(dimethylsilyl)amide [(1-Me-2-PhC$_9$H$_6$)$_2$GdN(SiHMe$_2$)$_2$], 42.3 μmol of dimethylanilinium tetrakis(pentafluorophenyl)borate [Me$_2$NHPhB(C$_6$F$_5$)$_4$], and 1.78 mmol of diisobutylaluminum hydride were charged in a glass container, and dissolved with 10 mL of toluene, to thereby obtain a catalyst solution. After that, the catalyst solution was taken out from the glovebox and the catalyst solution was added by 35 μmol of gadolinium equivalent to the monomer solution, before introducing 600 g of a monomer solution containing 100 g (1.85 mol) of 1,3-butadiene, which was then subjected to polymerization at 80° C. for 240 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer A. The yield of the terpolymer A thus obtained was 154 g.

Synthesis Example 2: Terpolymer B

A toluene solution of 250 g containing 50 g (0.48 mol) of styrene was added to a 2 L stainless steel reactor that had been sufficiently dried. Meanwhile, in a glovebox under a nitrogen atmosphere, 38.5 µmol of 1,3-bis(t-butyldimethylsilyl)indenyl gadolinium bis(bis(dimethylsilyl)amide) [(1,3-(t-BuMe$_2$Si)$_2$C$_9$H$_6$Gd(N(SiHMe$_2$)$_2$)$_2$], 42.3 µmol of dimethylanilinium tetrakis(pentafluorophenyl)borate [Me$_2$NHPhB(C$_6$F$_5$)$_4$], and 1.78 mmol of diisobutylaluminum hydride were charged in a glass container, and dissolved with 10 mL of toluene, to thereby obtain a catalyst solution. After that, the catalyst solution was taken out from the glovebox and the catalyst solution was added by 35 µmol of gadolinium equivalent to the monomer solution, before introducing 600 g of a monomer solution containing 150 g (2.78 mol) of 1,3-butadiene, which was then subjected to polymerization at 80° C. for 240 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer B. The yield of the terpolymer B thus obtained was 264 g.

Synthesis Example 3: Terpolymer C

A toluene solution of 250 g containing 50 g (0.48 mol) of styrene was added to a 2 L stainless steel reactor that had been sufficiently dried. Meanwhile, in a glovebox under a nitrogen atmosphere, 35 µmol of bis(1-ethyl-2-phenylindenyl)gadolinium bis(dimethylsilyl)amide [(1-Et-2-PhC$_9$H$_5$)$_2$Gd(N(SiHMe$_2$)$_2$], 1.78 mmol of diisobutylaluminum hydride, and 38.5 mmol of dimethylanilinium tetrakis(pentafluorophenyl)borate [Me$_2$NHPhB(C$_6$F$_5$)$_4$] were charged in a glass container, and dissolved with 10 mL of toluene, to thereby obtain a catalyst solution. After that, the catalyst solution was taken out from the glovebox and the catalyst solution was added by 35 µmol of gadolinium equivalent to the monomer solution, before introducing 600 g of a monomer solution containing 150 g (2.78 mol) of 1,3-butadiene, which was then subjected to polymerization at 80° C. for 240 minutes under ethylene pressure (1.5 MPa). After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 60° C. to obtain a polymer C. The yield of the polymer C thus obtained was 78 g.

Synthesis Example 4: Terpolymer D

A toluene solution of 250 g containing 50 g (0.48 mol) of styrene was added to a 2 L stainless steel reactor that had been sufficiently dried. Meanwhile, in a glovebox under a nitrogen atmosphere, 35 µmol of bis(1-benzyl-2-phenylindenyl)gadolinium bis(dimethylsilyl)amide [(1-Bn-2-PhC$_9$H$_5$)$_2$GdN(SiHMe$_2$)$_2$], 1.78 mmol of diisobutylaluminum hydride, and 38.5 mmol of dimethylanilinium tetrakis(pentafluorophenyl)borate [Me$_2$NHPhB(C$_6$F$_5$)$_4$] were charged in a glass container, and dissolved with 10 mL of toluene, to thereby obtain a catalyst solution. After that, the catalyst solution was taken out from the glovebox and the catalyst solution was added by 35 µmol of gadolinium equivalent to the monomer solution, before introducing 600 g of a monomer solution containing 150 g (2.78 mol) of 1,3-butadiene, which was then subjected to polymerization at 80° C. for 240 minutes under ethylene pressure (1.5 MPa). After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 60° C. to obtain a polymer D. The yield of the polymer D thus obtained was 86 g.

Synthesis Example 5: Terpolymer E

A toluene solution of 250 g containing 50 g (0.48 mol) of styrene was added to a 2 L stainless steel reactor that had been sufficiently dried. Meanwhile, in a glovebox under a nitrogen atmosphere, 35 µmol of bis(2-phenylindenyl)gadolinium trimethylsilane [(2-PhC$_9$H$_5$)$_2$GdSiMe$_3$], 0.89 mmol of diisobutylaluminum hydride, and 38.5 mmol of dimethylanilinium tetrakis(pentafluorophenyl)borate [Me$_2$NHPhB(C$_6$F$_5$)$_4$] were charged in a glass container, and dissolved with 10 mL of toluene, to thereby obtain a catalyst solution. After that, the catalyst solution was taken out from the glovebox and the catalyst solution was added by 35 µmol of gadolinium equivalent to the monomer solution, before introducing 600 g of a monomer solution containing 100 g (2.78 mol) of 1,3-butadiene, which was then subjected to polymerization at 80° C. for 240 minutes under ethylene pressure (1.5 MPa). After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 60° C. to obtain a polymer E. The yield of the polymer E thus obtained was 98 g.

Synthesis Example 6: Terpolymer H

A cyclohexane solution of 200 g containing 5 g (0.05 mol) of styrene was added to a 2 L stainless steel reactor that had been sufficiently dried. Meanwhile, in a glovebox under a nitrogen atmosphere, 64 µmol of 1,3-bis(t-butyldimethysilyl)indenyl)gadolinium bis(bis(dimethylsilyl)amide) [1,3-TBS$_2$IndGd(N(SiMe$_2$)$_2$)$_2$], 70 µmol of dimethylanilinium tetrakis(pentafluorophenyl)borate [Me$_2$NHPhB(C$_6$F$_5$)$_4$], and 2.45 mmol of diisobutylaluminum hydride, 64 µmol of diisobutylaluminum chloride were charged in a glass container, and dissolved with 20 mL of cyclohexane, to thereby obtain a catalyst solution. After that, the catalyst solution was taken out from the glovebox and added in the total amount to the reactor, before introducing 300 g of a monomer solution containing 90 g (1.66 mol) of 1,3-butadiene, which was then subjected to polymerization at 80° C. for 300 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer H. The yield of the terpolymer H thus obtained was 63 g.

Synthesis Example 7: Terpolymer I

A cyclohexane solution of 200 g containing 35 g (0.33 mol) of styrene was added to a 2 L stainless steel reactor that had been sufficiently dried. Meanwhile, in a glovebox under a nitrogen atmosphere, 160 μmol of 1,3-bis(t-butyldimethysilyl)indenyl neodymium bis(bis(dimethylsilyl)amide) [1,3-TBS$_2$NdGd(N(SiMe$_2$)$_2$)$_2$], 176 μmol of dimethylanilinium tetrakis(pentafluorophenyl)borate [Me$_2$NHPhB(C$_6$F$_5$)$_4$], and 3.46 mmol of diisobutylaluminum hydride were charged in a glass container, and dissolved with 50 mL of cyclohexane, to thereby obtain a catalyst solution. After that, the catalyst solution was taken out from the glovebox and added in the total amount to the reactor, before introducing 600 g of a monomer solution containing 150 g (2.77 mol) of 1,3-butadiene, which was then subjected to polymerization at 80° C. for 420 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer I. The yield of the terpolymer I thus obtained was 127 g.

Synthesis Example 8: Terpolymer J

A cyclohexane solution of 200 g containing 5 g (0.05 mol) of styrene was added to a 2 L stainless steel reactor that had been sufficiently dried. Meanwhile, in a glovebox under a nitrogen atmosphere, 64 μmol of 1,3-bis(t-butyldimethysilyl)indenyl gadolinium bis(bis(dimethylsilyl)amide) [13-TBS$_2$IndGd(N(SiMe$_2$)$_2$)$_2$], 70 μmol of dimethylanilinium tetrakis(pentafluorophenyl)borate [Me$_2$NHPhB(C$_6$F$_5$)$_4$], and 2.45 mmol of diisobutylaluminum hydride were charged in a glass container, and dissolved with 20 mL of cyclohexane, to thereby obtain a catalyst solution. After that, the catalyst solution was taken out from the glovebox and added in the total amount to the reactor, before introducing 400 g of a monomer solution containing 80 g (1.48 mol) of 1,3-butadiene, which was then subjected to polymerization at 80° C. for 300 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer J. The yield of the terpolymer J thus obtained was 79 g.

Synthesis Example 9: Terpolymer K

A cyclohexane solution of 200 g containing 40 g (0.38 mol) of styrene was added to a 2 L stainless steel reactor that had been sufficiently dried. Meanwhile, in a glovebox under a nitrogen atmosphere, 64 μmol of 1,3-bis(t-butyldimethysilyl)indenyl gadolinium bis(bis(dimethylsilyl)amide) [1,3-TBS$_2$IndGd(N(SiMe$_2$)$_2$)$_2$], 70 μmol of dimethylanilinium tetrakis(pentafluorophenyl)borate [Me$_2$NHPhB(C$_6$F$_5$)$_4$], and 2.45 mmol of diisobutylaluminum hydride were charged in a glass container, and dissolved with 20 mL of cyclohexane, to thereby obtain a catalyst solution. After that, the catalyst solution was taken out from the glovebox and added in the total amount to the reactor, before introducing a monomer solution containing 10 g (0.19 mol) of 1,3-butadiene, which was then subjected to polymerization at 80° C. for 300 minutes under ethylene pressure (1.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer K. The yield of the terpolymer K thus obtained was 96 g.

Synthesis Example 10: Terpolymer L

A cyclohexane solution of 200 g containing 90 g (0.87 mol) of styrene was added to a 2 L stainless steel reactor that had been sufficiently dried. Meanwhile, in a glovebox under a nitrogen atmosphere, 64 μmol of 1,3-bis(t-butyldimethysilyl)indenyl gadolinium bis(bis(dimethylsilyl)amide) [1,3-TBS$_2$IndGd(N(SiMe$_2$)$_2$)$_2$], 70 μmol of dimethylanilinium tetrakis(pentafluorophenyl)borate [Me$_2$NHPhB(C$_6$F$_5$)$_4$], and 2.45 mmol of diisobutylaluminum hydride were charged in a glass container, and dissolved with 20 mL of cyclohexane, to thereby obtain a catalyst solution. After that, the catalyst solution was taken out from the glovebox and added in the total amount to the reactor, before introducing 400 g of a monomer solution containing 80 g (1.48 mol) of 1,3-butadiene, which was then subjected to polymerization at 80° C. for 460 minutes under ethylene pressure (0.5 MPa). After the polymerization, 1 mL of an isopropanol solution containing, by 5 mass %, 2,2'-methylene-bis(4-ethyl-6-t-butylphenol) (NS-5), was added to stop the reaction. Then, a large amount of 2-propanol was further added to isolate the copolymer, and the copolymer was vacuum dried at 60° C. to obtain a terpolymer L. The yield of the terpolymer L thus obtained was 79 g.

Synthesis Example 11: Hydrogenated SBR Copolymer F (Step 1: Synthesis of High Cis-Containing SBR)
In a glovebox under a nitrogen atmosphere, 104 g (1 mol) of styrene and 50 g of toluene were added to a 1 L pressure-resistant glass bottle that had been sufficiently dried, and the bottle was capped. Then, the bottle was taken out from the glovebox, and charged with 54 g (1 mol) of 1,3-butadiene, to obtain a monomer solution. Meanwhile, in a glovebox under a nitrogen atmosphere, 60 μmol of bis(2-phenylindenyl)gadolinium bis(dimethylsilyl)amide [(2-PhC$_9$H$_5$)$_2$GdN(SiHMe$_2$)$_2$], 60 μmol of triphenylcarbonium tetrakis(pentafluorophenyl)borate [Ph$_3$CB(C$_6$F$_5$)$_4$], and 500 μmol of diisobutylaluminum hydride were charged in a glass container, and dissolved with 10 mL of toluene, to thereby obtain a catalyst solution. After that, the catalyst solution was taken out from the glovebox and added to the monomer solution, which was then subjected to polymerization at 70° C. for 30 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol/hydrochloric acid mixture solvent was used to isolate the copolymer, and the copolymer was vacuum dried at 60° C. to obtain a high-cis containing SBR of 29.6 g.

(Step 2: Hydrogenation of High Cis-Containing SBR)
In a glovebox, polymer cement obtained by dissolving 25 g of high-cis containing SBR obtained as above (Step 1) into 400 g of hexane was added to a 2 L stainless steel pressure-resistant reactor that had been sufficiently dried. Meanwhile, in a glovebox under a nitrogen atmosphere, 0.06 mmol of bis(2-ethylhexanoic acid)nickel [Ni(OC=OCH(Et)C$_4$H$_9$)$_2$] and 0.40 mmol of triethylaluminum were charged in a glass container, and dissolved with 10 mL of hexane, to thereby obtain a catalyst solution. After that, the catalyst solution was taken out from the glovebox and added to the polymer cement, which was then reacted at 50° C. for 20 minutes under hydrogen pressure (0.2 MPa). After the reaction, 5 mL of an isopropanol solution containing, by 5 mass %, 2,2'-methylene-bis(4-ethyl-6-t-butylphenol) (NS-5), was added. Thereafter, a large amount of methanol was used to isolate the copolymer, and the copolymer was vacuum dried at 60° C. to obtain the polymer F. The yield of the polymer F thus obtained was 21 g.

Synthesis Example 12: Hydrogenated SBR Copolymer G (Step 1: Synthesis of High Cis-Containing SBR)

In a glovebox under a nitrogen atmosphere, 104 g (1 mol) of styrene and 50 g of toluene were added to a 1 L pressure-resistant glass bottle that had been sufficiently dried, and the bottle was capped. Then, the bottle was taken out from the glovebox, and charged with 54 g (1 mol) of 1,3-butadiene, to obtain a monomer solution. Meanwhile, in a glovebox under a nitrogen atmosphere, 60 µmol of bis(2-phenylindenyl)gadolinium bis(dimethylsilyl)amide [(2-PhC$_9$H$_5$)$_2$GdN(SiHMe$_2$)$_2$], 60 µmol of triphenylcarbonium tetrakis(pentafluorophenyl)borate [Ph$_3$CB(C$_6$F$_5$)$_4$], and 700 µmol of diisobutylaluminum hydride were charged in a glass container, and dissolved with 10 mL of toluene, to thereby obtain a catalyst solution. After that, the catalyst solution was taken out from the glovebox and added to the monomer solution, which was then subjected to polymerization at 70° C. for 30 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol/hydrochloric acid mixture solvent was used to isolate the copolymer, and the copolymer was vacuum dried at 60° C. to obtain a high-cis containing SBR of 27.3 g.

(Step 2: Hydrogenation of High Cis-Containing SBR)

Under a nitrogen atmosphere, polymer cement obtained by dissolving 25 g of high-cis containing SBR obtained as above (Step 1) into 400 g of hexane was added to a 2 L stainless steel pressure-resistant reactor that had been sufficiently dried. Meanwhile, in a glovebox under a nitrogen atmosphere, 0.06 µmmol of bis(2-ethylhexanoic acid)nickel [Ni(OC═OCH(Et)C$_4$H$_9$)$_2$] and 0.40 mmol of triethylaluminum were charged in a glass container, and dissolved with 10 mL of hexane, to thereby obtain a catalyst solution. After that, the catalyst solution was taken out from the glovebox and added to the polymer cement, which was then reacted at 50° C. for 20 minutes under hydrogen pressure (0.2 MPa). After the reaction, 5 mL of an isopropanol solution containing, by 5 mass %, 2,2'-methylene-bis(4-ethyl-6-t-butylphenol) (NS-5) was added. Thereafter, a large amount of methanol was used to isolate the copolymer, and the copolymer was vacuum dried at 60° C. to obtain the polymer G. The yield of the polymer G thus obtained was 16.4 g.

Synthesis Example 13: Hydrogenated SBR Copolymer M (Step 1: Synthesis of High Cis-Containing SBR)

In a glovebox under a nitrogen atmosphere, 104 g (1 mol) of styrene and 50 g of toluene were added to a 1 L pressure-resistant glass bottle that had been sufficiently dried, and the bottle was capped. Then, the bottle was taken out from the glovebox, and charged with 54 g (1 mol) of 1,3-butadiene, to obtain a monomer solution. Meanwhile, in a glovebox under a nitrogen atmosphere, 60 µmol of bis(2-phenyl-3-methylindenyl)gadolinium(bis(dimethylsilyl)amide) [(2-Ph-3-MeC$_9$H$_5$)$_2$GdN(SiHMe$_2$)$_2$], 60 µmol of triphenylcarbonium tetrakis(pentafluorophenyl)borate [Ph$_3$CB(C$_6$F$_5$)$_4$], and 700 µmol of diisobutylaluminum hydride were charged in a glass container, and dissolved with 10 mL of toluene, to thereby obtain a catalyst solution. After that, the catalyst solution was taken out from the glovebox and added to the monomer solution, which was then subjected to polymerization at 70° C. for 30 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol/hydrochloric acid mixture solvent was used to isolate the copolymer, and the copolymer was vacuum dried at 60° C. to obtain a high-cis containing SBR of 29.6 g.

(Step 2: Hydrogenation of High Cis-Containing SBR)

A catalyst solution of nickel naphthanate:triethylaluminum butadiene=1:3:3 (molar ratio) was preliminarily prepared in a separate container, and the catalyst solution was charged such that the mixture contains 1 mol of nickel per 1000 mol of butadiene portion included in the SBR. After that, hydrogen was introduced into the reaction system under 30 atm hydrogen pressure, and then reacted at 80° C. After the reaction, 5 mL of an isopropanol solution containing, by 5 mass %, 2,2'-methylene-bis(4-ethyl-6-t-butylphenol) (NS-5) was added. Thereafter, a large amount of methanol was used to isolate the copolymer, and the copolymer was vacuum dried at 60° C. to obtain the polymer M. The yield of the polymer M thus obtained was 13.8 g.

(Confirmation of Multicomponent Copolymer)

The copolymers A to G obtained as described above were measured for $^1$H-NMR spectrum and $^{13}$C-NMR spectrum to confirm characteristic curves derived from each monomer, and then measured for a gel permeation chromatography-refractive ratio curve (GPC-RI curve) and for a gel permeation chromatography-UV absorption curve (GPC-UV curve) to confirm an aromatic ring skeleton derived from an aromatic vinyl compound, in order to confirm whether or not the copolymer was a terpolymer.

Figure 1:
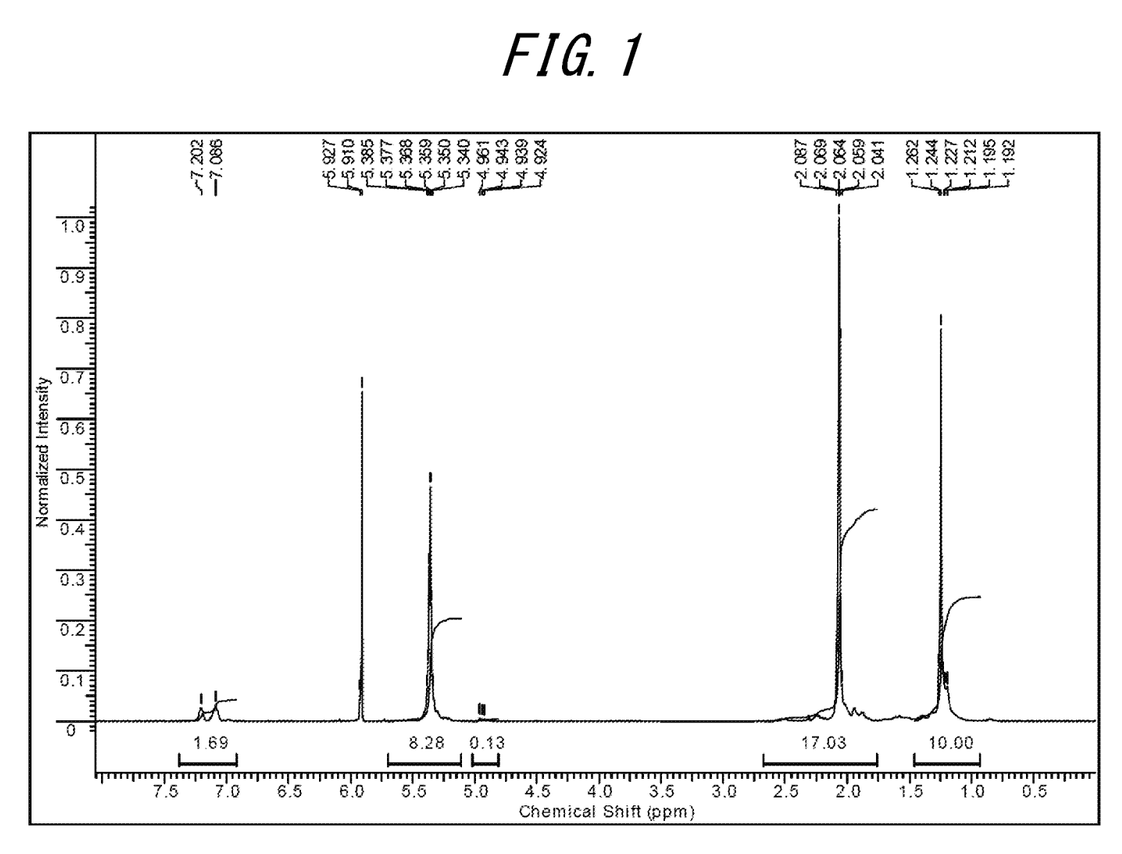
FIG. 1 shows a ¹H-NMR spectrum of a terpolymer A produced by an embodiment of the disclosed production method.
Figure 2:
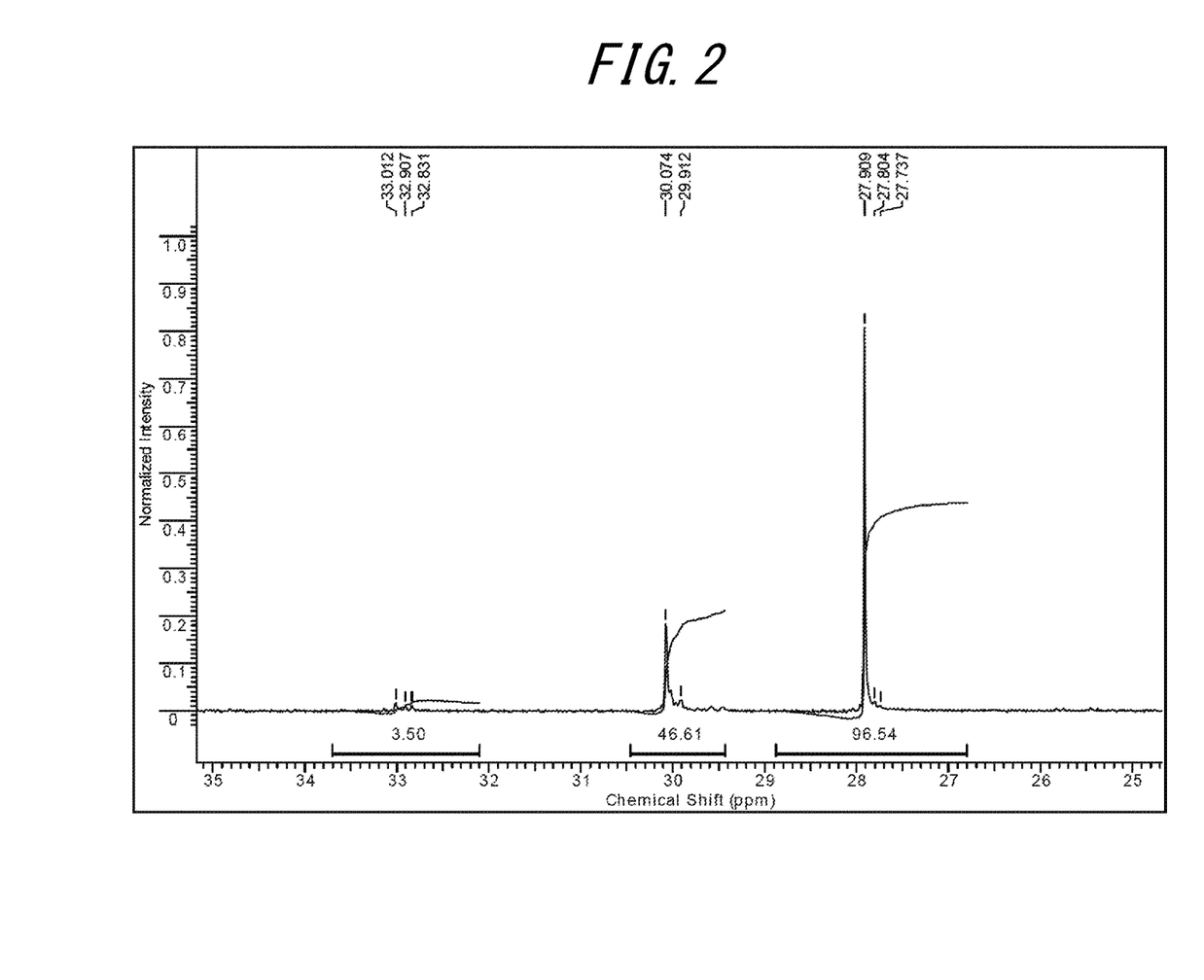
FIG. 2 shows a ¹³C-NMR spectrum of the terpolymer A produced by an embodiment of the disclosed production method.
Figure 3:
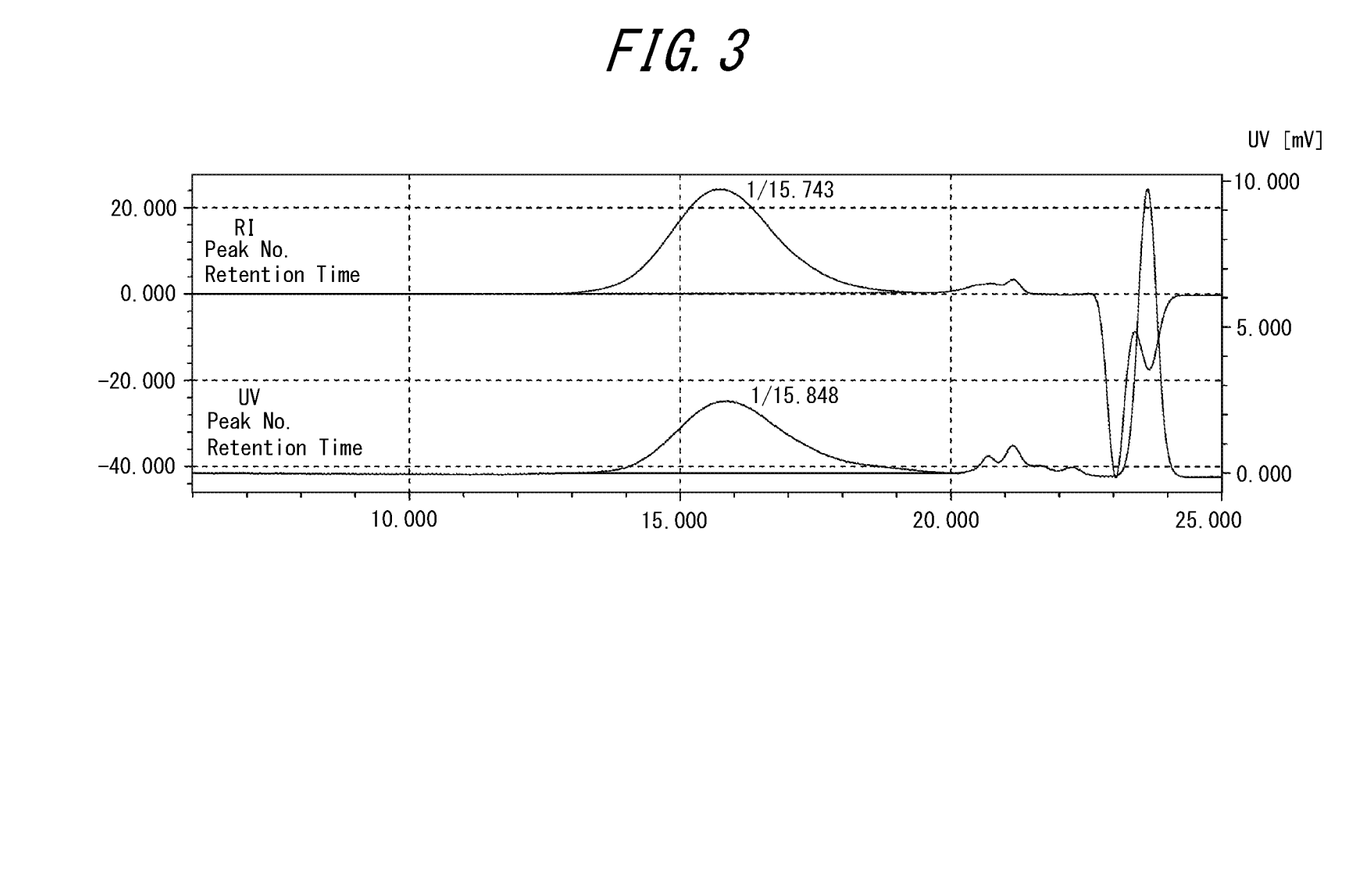
FIG. 3 shows a GPC-RI curve and a GPC-UV curve of the terpolymer A produced by an embodiment of the disclosed production method.

As an example, FIGS. 1, 2, and 3 each show the $^1$H-NMR spectrum, the $^{13}$C-NMR spectrum, and the GPC-RI curve and the GPC-UV curve of the copolymer A, respectively.

The $^1$H-NMR spectrum and the $^{13}$C-NMR spectrum were measured at 100° using tetrachloroethane as a solvent. In FIGS. 1 and 2, the horizontal axis shows the chemical shift value (ppm) and the vertical axis shows the peak intensity (integral value).

The GPC-RI curve and the GPC-UV curve were measured using tetrahydrofuran (THF) as a solvent. In FIG. 3, the horizontal axis shows the elution time (minute) and the vertical axis shows the refractive index (mV) and the ultraviolet absorption (mV) (the left scale: refractive index, the right scale: ultraviolet absorption). FIG. 3 shows the GPC-RI curve on the upper side and the GPC-UV curve on the lower side. The UV absorption was found in the same molecular weight region as the main peak detected by the RI detector, and thus, the copolymer A was confirmed to have a styrene skeleton in its molecule.

In this manner, the copolymers A to M were confirmed to be terpolymers.

(Confirmation of the Main Chain Structure of the Copolymer)

Further, the $^{13}$C-NMR spectrum obtained for the copolymer C was confirmed as to whether or not the spectrum has any peak derived from a 3-5 membered alicyclic ring structure. Hexachlorobutadiene was used as a solvent in the measurement.

Figure 4:
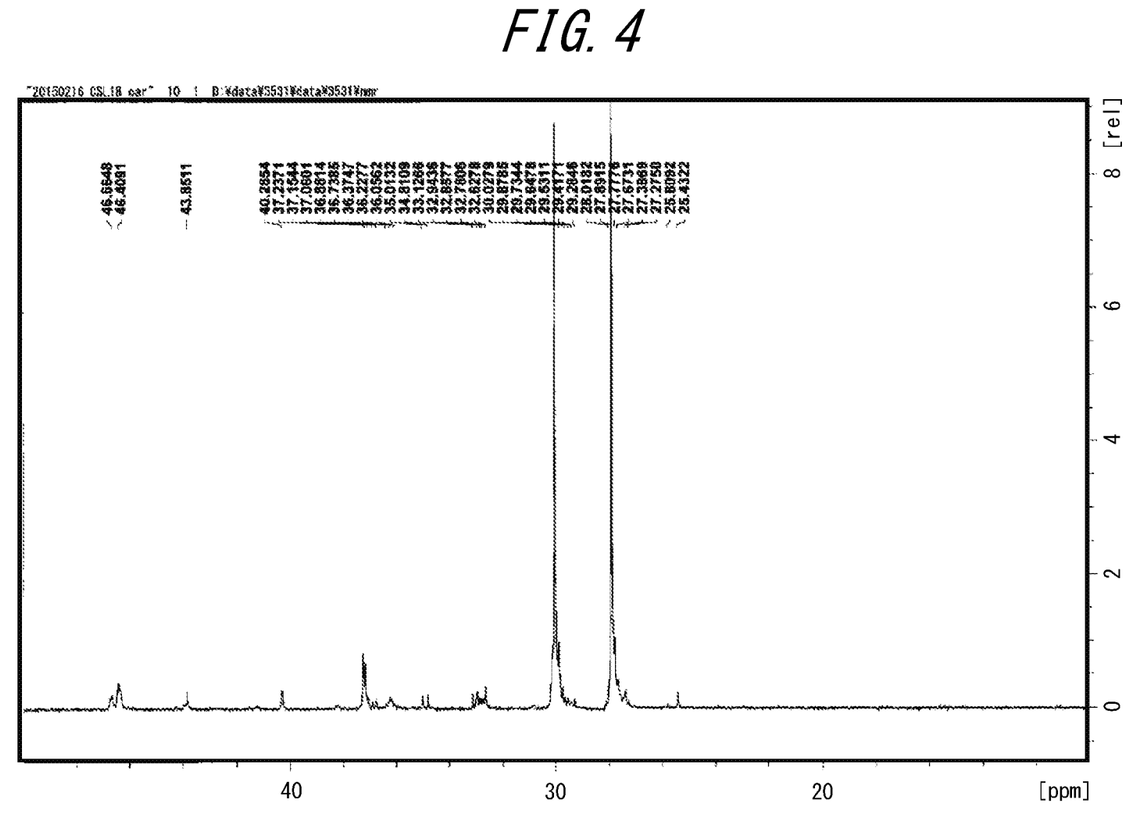
FIG. 4 is an enlarged view of a range of 10 ppm to 50 ppm in a ¹³C-NMR spectrum of a terpolymer C produced by an embodiment of the disclosed production method.

As an example, FIG. 4 shows the $^{13}$C-NMR spectrum of the copolymer C, which is enlarged in a range of 10 ppm to 50 ppm. The horizontal axis shows the chemical shift value (ppm) and the vertical axis shows the peak intensity (integral value). The $^{13}$C-NMR spectrum had no peak (in a range of 10 to 24 ppm) derived from carbons forming the 3-5 acyclic structure. In this manner, it was confirmed that the synthesized copolymers each had a main chain consisting exclusively of an acyclic structure.

(Identification of Copolymer)

The copolymers A to M were measured and evaluated for the weight average molecular weight (Mw), the molecular weight distribution (Mw/Mn), the microstructure, and the melting point ($T_m$) by the following method. Table 1 shows the results thereof.

(1) Weight-Average Molecular Weight (Mw) and Molecular Weight Distribution (Mw/Mn)

A polystyrene equivalent weight-average molecular weight (MW) and a molecular weight distribution (Mw/Mn) of each of the copolymers A to G were obtained through gel permeation chromatography [GPC: HLC-8220GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 40° C.

For example, the molar ratio of butadiene (Bd)/ethylene (Et) was calculated as below for the copolymer A, based on the sum of the peak integral values in a range of 27.0 to 28.5 ppm and a range of 32.0 to 34.0 ppm and the peak integral values in 29.5 to 31.0 ppm of the measured $^{13}$C-NMR spectrum.

Bd:Et=(96.5+3.5):46.6=100:46.6

Further, the molar ratio of butadiene (Bd)/styrene (St) was calculated as below for the copolymer A, based on the sum of the peak integral values in a range of 4.75 to 5.10 ppm and a range of 5.20 to 5.50 ppm and the peak integral values in a range of 6.75 to 7.50 ppm of the measured $^1$H-NMR spectrum.

Bd:St=(8.28+0.13)/2:1.69/5=4.2:0.34

(3) Melting Point ($T_m$)

The copolymers A to M were measured for melting points using differential scanning calorimeter (DSC. "DSCQ2000" manufactured by TA Instruments Japan Inc.), according to JIS K 7121-1987. The crystallinity decreases as the melting point becomes lower; when no melting point is detected, the copolymer is amorphous. Here, the "none" in Table 1 means that there was no melting point. When the copolymer had a plurality of melting points, the value of the highest is shown in Table 1 as the evaluation target.

TABLE 1

|  | Example 1 Terpolymer A | Example 2 Terpolymer B | Example 3 Terpolymer C | Example 4 Terpolymer D | Example 5 Terpolymer E | Comparative Example 1 Hydrogenated SBR Copolymer F | Comparative Example 2 Hydrogenated SBR Copolymer G |
|---|---|---|---|---|---|---|---|
| Weight-Average Molecular Weight Mw | 290,000 | 304,000 | 261,000 | 26,000 | 184,000 | 176,000 | 81,000 |
| Molecular Weight Distribution Mw/Mn | 2.21 | 4.64 | 1.87 | 4.5 | 2.17 | 4.31 | 3.47 |
| Cis-1,4 Bond Content (%) | 95 | 94.2 | 94.6 | 92.3 | 96.1 | 48.3 | 46.7 |
| Trans-1,4 Bond Content (%) | 3.45 | 2.55 | 4.22 | 5.87 | 2.25 | 50.3 | 51.5 |
| 1,2 Vinyl Bond Content (%) | 1.55 | 3.25 | 1.18 | 1.83 | 1.65 | 1.4 | 1.8 |
| Content of Butadiene Units (mol %) | 83.2 | 52.1 | 23.6 | 86.7 | 93.1 | 63 | 48 |
| Content of Ethylene Units (mol %) | 15.3 | 43.3 | 67.5 | 1.7 | 5.76 | 35.0 | 36.1 |
| Content of Styrene Units (mol %) | 1.5 | 4.6 | 8.9 | 11.6 | 1.12 | 2.0 | 15.9 |
| Melting Point Tm (° C.) | 40.6 | 46.8 | 44.9 | none | none | none | none |

TABLE 2

|  | Example 6 Terpolymer H | Example 7 Terpolymer I | Example 3 Terpolymer J | Example 4 Terpolymer K | Example 5 Terpolymer L | Comparative Example 3 Hydrogenated SBR Copolymer M |
|---|---|---|---|---|---|---|
| Weight-Average Molecular Weight Mw | 163,000 | 89,000 | 163,000 | 218,000 | 61,000 | 184,000 |
| Molecular Weight Distribution Mw/Mn | 4.61 | 4.26 | 4.61 | 2.65 | 3.41 | 4.02 |
| Cis-1,4 Bond Content (%) | 92.4 | 89.3 | 92.4 | 93.4 | 92.5 | 48.3 |
| Trans-1,4 Bond Content (%) | 6.5 | 6.1 | 5.8 | 2.3 | 6.1 | 43.6 |
| 1,2 Vinyl Bond Content (%) | 2.2 | 4.6 | 1.8 | 4.3 | 1.4 | 8.2 |
| Content of Butadiene Units (mol %) | 71.6 | 96.8 | 99.4 | 0.8 | 35.3 | 65 |
| Content of Ethylene Units (mol %) | 26 | 1.1 | 0.5 | 83.5 | 25.6 | 30.4 |
| Content of Styrene Units (mol %) | 2.4 | 2.1 | 0.1 | 15.7 | 39.1 | 4.6 |
| Melting Point Tm (° C.) | 83.4 | none | none | 95.3 | 92.4 | none |

(2) Microstructure

Microstructures in the copolymers A to M were obtained based on, for example, an integration ratio of the $^1$H-NMR spectrum (1,2-vinyl bond content) and the $^{13}$C-NMR spectrum (the content ratio of cis-1,4 bond and trans-1,4 bond). Table 1 shows the cis-1,4 bond content (%), the trans-1,4 bond content (%) and the 1,2 vinyl bond content (%) in the total butadiene units, the content (mol %) of butadiene units, the content (mol %) of ethylene units, and the content (mol %) of styrene units.

The results shown in Table 1 demonstrate that the multicomponent copolymers of Examples have various weight average molecular weights, various copolymerization ratios, and various degrees of crystallinity. Further, the multicomponent copolymers of Examples are shown to have a 1.4 bond content higher than that of the hydrogenated SBR copolymer as Comparative Examples.

Therefore, the disclosed method of producing a multicomponent copolymer includes polymerizing a conjugated diene compound, a non-conjugated olefin compound, and an aromatic vinyl compound, to thereby efficiently produce multicomponent copolymers having various microstructures. Further, the multicomponent copolymers thus produced each have a main chain consisting of an acyclic structure, which means that the disclosed method of producing a multicomponent copolymer can polymerize a conjugated diene compound, a non-conjugated olefin compound, and a vinyl group of an aromatic vinyl compound through stereoselective and site-selective addition polymerization.

INDUSTRIAL APPLICABILITY

The disclosed method for producing a multicomponent copolymer may be used in producing a multicomponent copolymer formed of a conjugated diene compound, a non-conjugated olefin compound, and an aromatic vinyl compound. Further, the disclosed multicomponent copolymer may be used for a rubber composition as raw materials for rubber products such as tires, vibration-insulating rubbers, seismic isolation rubbers, belts of conveyer belts, rubber crawlers, and various hoses.

The invention claimed is:

1. A method for producing a multicomponent copolymer, comprising copolymerizing a conjugated diene compound, a non-conjugated olefin compound, and an aromatic vinyl compound in the presence of a polymerization catalyst composition including at least one complex selected from the group consisting of: a metallocene complex represented by the following general formula (I); a metallocene complex represented by the following general formula (II); and a half metallocene cation complex represented by the following general formula (III):

(I)

(in the formula (I), M represents a lanthanoid element, scandium, or yttrium; $Cp^R$ each independently represents a substituted indenyl group; $R^a$ to $R^f$ each independently represent a hydrogen atom or an alkyl group having 1 to 3 carbon atoms; L represents a neutral Lewis base; and w represents an integer of 0 to 3);

(II)

(in the formula (II), M represents a lanthanoid element, scandium, or yttrium; $Cp^R$ each independently represents a substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3); and (III)

(in the formula (III), M represents a lanthanoid element, scandium, or yttrium; $Cp^{R'}$ each independently represents a substituted cyclopentadienyl group, a substituted indenyl group, or a substituted fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion) to produce a multicomponent copolymer having a main chain consisting of an acyclic structure.

2. The method for producing a multicomponent copolymer according to claim 1, wherein $Cp^{R'}$ in the general formula (III) is a substituted indenyl group, and the substituted indenyl group in the complex represented by the general formula (I), (II), or (III) has two or more substituents.

3. The method for producing a multicomponent copolymer according to claim 1, wherein the substituted indenyl group has at least one substituent on a five-membered ring of the substituted indenyl group.

4. The method for producing a multicomponent copolymer according to claim 1, wherein the substituted indenyl group has at least one substituent on a phenyl group.

5. The method for producing a multicomponent copolymer according to claim 1, wherein the non-conjugated olefin compound is an acyclic non-conjugated olefin compound.

6. The method for producing a multicomponent copolymer according to claim 5, wherein the non-conjugated olefin compound is α-olefin.

7. The method for producing a multicomponent copolymer according to claim 6, wherein the non-conjugated olefin compound is ethylene.

8. The method for producing a multicomponent copolymer according to claim 1, wherein the aromatic vinyl compound is styrene.

9. The method for producing a multicomponent copolymer according to claim 1, wherein the conjugated diene compound is 1,3-butadiene.

10. The method for producing a multicomponent copolymer according to claim 1, wherein the multicomponent copolymer produced has a 1,4 bond content of 50% or more in the total units derived from a non-conjugated diene compound in the multicomponent copolymer produced.

11. The method for producing a multicomponent copolymer according to claim 1, wherein the method uses hexane as a solvent.

* * * * *